Feb. 14, 1956 A. W. COOK 2,734,778
REINFORCED TIRE SUPPORTING MEMBER
Filed May 6, 1950 2 Sheets-Sheet 1

INVENTOR.
ALBERT W. COOK
BY
R. L. Miller
ATTORNEY

Feb. 14, 1956  A. W. COOK  2,734,778
REINFORCED TIRE SUPPORTING MEMBER
Filed May 6, 1950  2 Sheets-Sheet 2

INVENTOR.
ALBERT W. COOK
BY
ATTORNEY

United States Patent Office 2,734,778
Patented Feb. 14, 1956

2,734,778

REINFORCED TIRE SUPPORTING MEMBER

Albert W. Cook, Akron, Ohio, assignor, by mesne assignments, to The Goodyear Tire & Rubber Company, a corporation of Ohio Application May 6, 1950, Serial No. 160,524

3 Claims. (Cl. 301—8)

This invention relates to wheels, rims, and other tire supporting members and, more particularly, is concerned with members of this type made from cast metals and having endless tire-retaining flanges reinforced with endless rings of steel or similar material.

It is the usual practice in the aircraft industry to make airplane wheels of cast magnesium or aluminum, or of alloys thereof in order to keep the weight of the wheels to a minimum. Usually these wheels or other members are adapted to mount pneumatic or similar tires and are cast with endless integral tire or bead retaining flanges at one or both sides. When landing a heavy airplane, for example, the wheels and tires are often subjected to heavy shock loads, as in a bounce landing. Moreover, roll life of wheels may be limited because of fatigue and failure of wheels occurring at the stress concentration point existing in a wheel where the tire retaining flange joins the base portion of the wheel. It will be recognized that high landing impacts and usual roll loads act through a pneumatic tire to impress strong lateral forces on the tire or tire bead retaining flanges with the attendant stress concentration or fatigue described.

Efforts to increase the radius of the fillet joining the tire-retaining flange to the wheel base may necessitate changes in cross-sectional contour of a pneumatic tire bead, which is undesirable. Increasing the thickness of the casting to the outside of the tire retaining flange and around the outside of the wheel tend to make the wheel heavy and awkward and are often prohibited by size or clearance limitations.

It is the general object of the invention to avoid and overcome the foregoing and other difficulties of and objections to known wheel constructions, and the constructions of other tire-supporting members, by the provision of an improved, relatively inexpensive and light weight cast wheel or other tire carrying member including a tire retaining flange reinforced with an endless ring of steel or the like.

Another object of the invention is the provision of a tire retaining flange which is pre-stressed in compression at the point of stress concentration with the wheel so that loads imposed upon the tire-retaining flange must overcome the compressive forces and move the point of stress concentration back through neutral and into the range of tensile stresses before stress concentration failures can occur.

Another object of the invention is to provide a cast magnesium airplane wheel having integral tire bead retaining flanges, the flanges being reinforced with endless steel rings which prevent breakage of the bead retaining flanges from the wheel under even shock load conditions.

Another object of the invention is to provide a reinforcing ring of the character described in association with a cast metal wheel, the ring also serving to support in splined relation a brake disc.

The foregoing objects of the invention, and other objects which will become apparent as the description proceeds, are achieved by the provision of a combination including a supporting member, an endless tire bead retaining flange integral with the supporting member and having an endless laterally directed lip, and an endless reinforcing ring positioned concentrically inside the lip, the lip being stressed in tension by the ring and being bent inwardly to pre-stress in compression the point of stress concentration of the flange with respect to the supporting member, and the ring being stressed in compression by the lip. The supporting member is usually of cast magnesium or aluminum. The reinforcing ring may have an I-shape in cross section, and may be employed to support a brake disc in splined relation with the wheel or supporting member.

For a better understanding of the invention, reference should be had to the accompanying drawings wherein—

Figure 1:
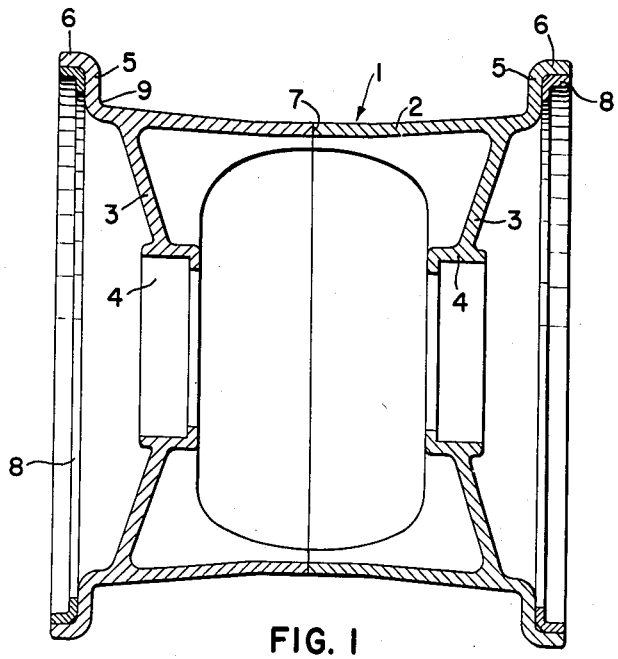
Fig. 1 is a vertical transverse diametric cross section of a cast metal wheel incorporating the principles of the invention.

In the drawings, the numeral 1 indicates generally a tire supporting member, and in the embodiment of the invention illustrated, this member comprises a wheel having a drum-shaped periphery 2 formed with integral spoke or disc portions 3 terminating in hubs 4. The drum-shaped periphery 2 of the wheel terminates at its ends in endless integral tire retaining flanges 5 in turn terminating in endless integral laterally-directed lip or flange portions 6 positioned substantially parallel to the rotary axis of the wheel.

The rotary member 1 of Fig. 1 is adapted to directly mount a pneumatic tire of the straight-side, inextensible bead type, and in order to achieve the mounting and demounting of the tire, the member 1 is usually split at its center, as at 7, although it will be recognized that the principles of the invention may be employed with wheels or rims having drop-center wells at their centers or removable ring types of tire-retaining flanges.

The rotary member or wheel of Fig. 1 is of the type adapted to be used on aircraft, and in accord with known practices, is usually cast from magnesium, aluminum, or alloys of one or the other or both of these materials. It will be recognized that the portions 2, 3, 4, 5, and 6 of the wheel can be cast integrally to the shape illustrated and described.

Positioned concentric with the lip or flange 6 of the wheel is an endless ring 8 of reinforcing material, for example high strength steel, with this ring 8 not only being positioned snugly under the lip 6 to reinforce it, but with the ring 8 usually engaging with the side of the tire-retaining flange 5.

One convenient way of assembling the ring 8 with the lip 6 and flange 5 is by a shrinking process, and this is achieved by effecting a temperature difference between the ring 8 and the rotary member which will permit assembly of the parts in the concentric relation described.

Figure 3:
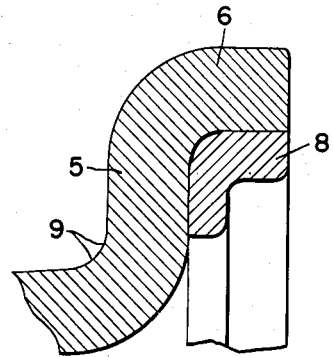
Fig. 3 is an enlarged, fragmentary illustration of a portion of Fig. 1 and showing the details of the reinforcing ring in association with the tire retaining flange.

More particularly, the ring 8 may be subjected to subnormal temperatures, and the remainder of the wheel is subjected to greater than normal temperature. The parts are then slipped together, and as both parts return to normal or room temperature, the shrinkage of the lip 6 and the expansion of the ring 8 cause the ring 8 to be firmly bound in place in concentric relation to the lip 6. This results in the ring 8 being under compression and the lip 6 being under tension, but, in addition, the flange 5, as seen in Fig. 3, is bent slightly to the left to put the area 9 under compressive stresses. This area 9 is the point of stress concentration between the flange 5 and the drum-shaped body portion 2 of the wheel. Pre-stressing the area 9 is important for the reason that when the flange 5 is subjected to forces tending to bend it outwardly, as occasioned by the normal rolling load on the wheel, the area 9 must first move back through the range of its compression, through neutral, and into tensile forces before a point of failure is reached.

Figure 4:
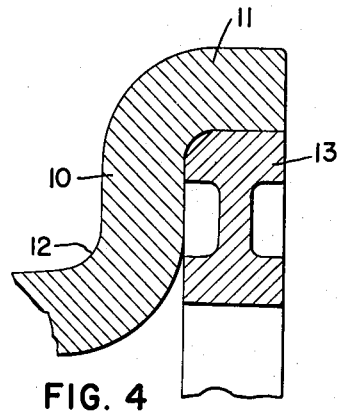
Figures 4 and 5 are views similar to Fig. 3, but illustrating modifications of the invention.
Figure 2:
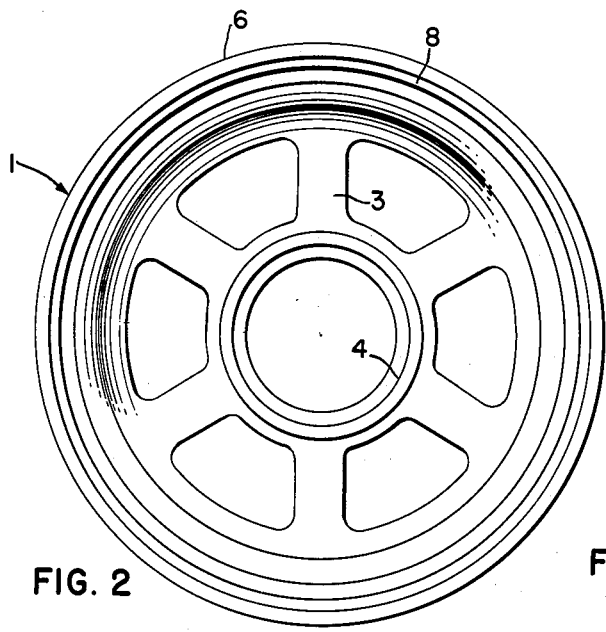
Fig. 2 is a side elevation of the wheel illustrated in Fig. 1.

In Fig. 4 is shown a modification of the invention wherein a tire-retaining flange 10 formed with an integral lip portion 11 and a base portion 12 is provided with a strengthening ring 13 generally similar to the strengthening ring 8, except the ring 13 is formed with an I-shape in cross section. This structure is somewhat stronger than that of Fig. 3 while retaining substantially the dimensions of the ring 8 of Fig. 3.

Figure 5:
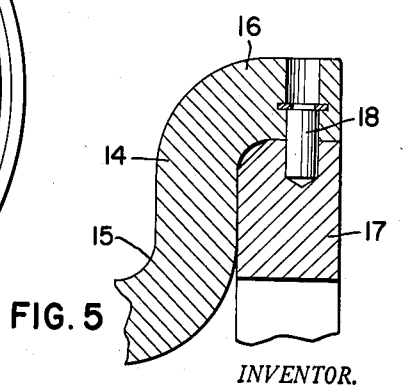

In Fig. 5 is illustrated a tire-retaining flange 14 formed integral with a base 15 and having a lip portion 16 which surrounds in concentric relation an endless strengthening ring 17. This embodiment of the invention differs from that of Figures 3 and 4 only in that the ring 17 is held in place in association with the lip 16, in addition to the shrinkage, by a plurality of pins 18 positioned at circumferentially spaced points around the lip 16.

Figure 6:
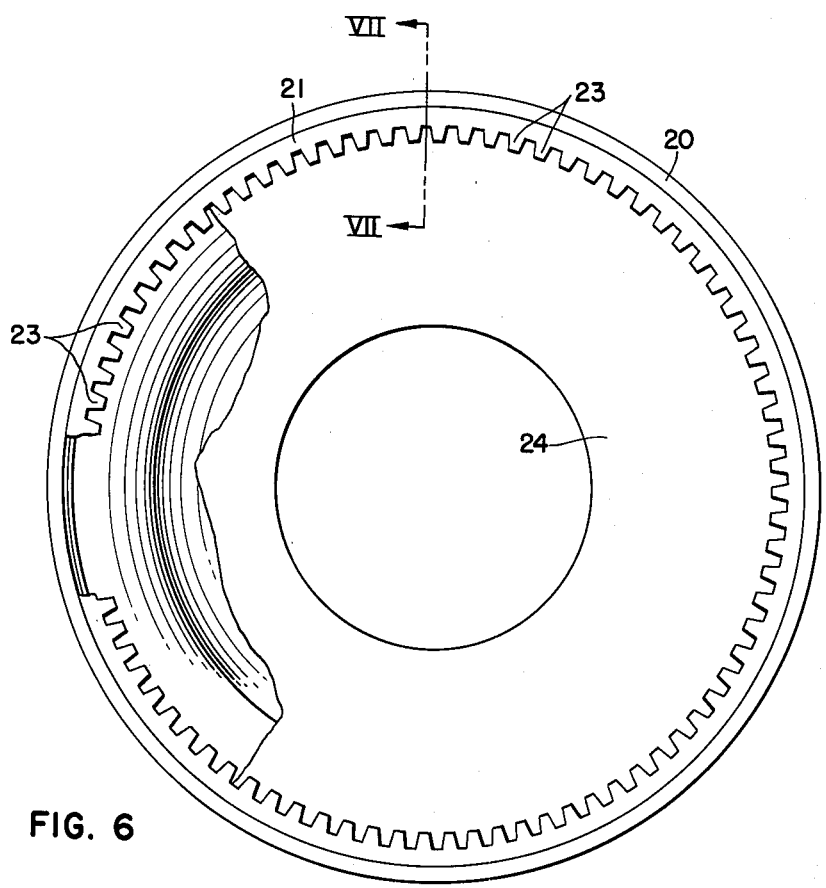
Fig. 6 is a side elevation of a tire retaining flange and strengthening ring wherein the strengthening ring is splined to a brake disc.
Figure 7:
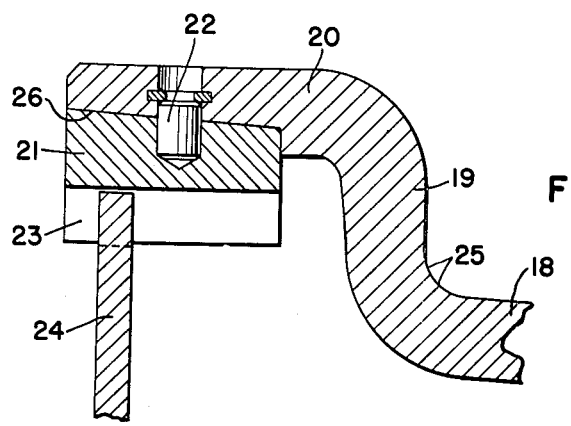
Fig. 7 is an enlarged fragmentary view similar to Figures 3 to 5, but taken on line VII—VII of Fig. 6.

In Fig. 6 is illustrated a rotary member 18 formed with an integral tire retaining flange 19 having an associated integral lip 20 which surrounds a strengthening ring 21 which is shaped to have a greater width than its radial thickness. The strengthening ring 21 may be secured to the lip 20 by means of circumferentially spaced pins 22. Note that in this embodiment of the invention, mating tapered surfaces 26 may be utilized between the ring 21 and the lip 20 to effect compressive forces at the stress point area 25, the ring 21 and lip 20 being pressed together and additionally held in pressed relation by the pins 22. The inner periphery of the strengthening ring 21 is formed with a plurality of teeth 23 which carry in splined relation a brake disc 24. Thus, the strengthening ring 21 serves the dual purpose of strengthening the tire retaining flange 19 with respect to its stress concentration area 25, and likewise serves to rotatably carry the brake disc 24 while permitting floating movement of the disc in a limited axial direction.

From the foregoing, it will be recognized that the various objects of the invention have been achieved by the provision of a relatively simple, inexpensive, and readily constructed wheel or other rotatable member adapted to mount a pneumatic or other tire. Stress concentrations at the point of greatest weakness between the tire-retaining flange and the body or periphery of the wheel are greatly reduced, wheel life is prolonged, and wheel failure is substantially eliminated.

While certain representative embodiments and details have been shown for the purpose of illustrating the invention, it will be apparent to those skilled in this art that various changes and modifications may be made therein without departing from the spirit or scope of the invention.

What is claimed is:

1. A tire support member including tire rim means of light weight cast metal including a tire bead-receiving portion substantially parallel to the axis of rotation of the tire support member, an integral bead-retaining flange extending substantially at right angles to the bead-receiving portion, the bead-retaining flange having an integral, endless, laterally outwardly directed lip thereon, and an endless strengthening metal ring in pressed engagement with the radially inner surfaces of the lip to reinforce it, stress it in tension, and to stress the ring in compression the lip and strengthening ring having mating tapered surfaces engaging each other.

2. In combination, a cast magnesium wheel adapted to receive a pneumatic tire and having at least one radially directed tire bead retaining flange cast integral with the wheel, the flange terminating in an axially directed shoulder flange cast integral with the wheel, and an endless metal ring positioned in compression under the shoulder flange and against the side of the tire retaining flange, said ring pre-stressing the tire retaining flange in a direction opposite to the force of the tire against the flange.

3. The combination in a pneumatic tire supporting member including tire rim means of cast metal of an endless tire bead retaining flange integral with the supporting member and having an integral endless laterally outwardly directed lip, and an endless reinforcing metal ring positioned concentrically inside the lip, said lip being stressed in tension by the ring, said bead retaining flange being bent inwardly by the ring to pre-stress in compression the point of stress concentration on the laterally inner portion of the flange with respect to the supporting member, and the ring being stressed in compression by the lip.

References Cited in the file of this patent

UNITED STATES PATENTS

| | | |
|---|---|---|
| 1,640,573 | Laddon | Aug. 30, 1927 |
| 1,659,365 | Laddon | Feb. 14, 1928 |
| 1,954,757 | Maranville | Apr. 10, 1934 |
| 1,971,604 | Frank | Aug. 28, 1934 |
| 2,016,435 | Isidin | Oct. 8, 1935 |
| 2,020,667 | Wahl | Nov. 12, 1935 |
| 2,528,163 | Myssen | Oct. 31, 1950 |